United States Patent [19]
Tunstall

[11] 3,940,468
[45] Feb. 24, 1976

[54] PROCESS FOR LAMINATING RIGID POLYURETHANE FOAM TO A GELLED POLYESTER RESIN

[75] Inventor: Reginald V. Tunstall, Santa Paula, Calif.

[73] Assignee: Fibre-Thane Homes, Inc., Van Nuys, Calif.

[22] Filed: July 24, 1972

[21] Appl. No.: 274,200

[52] U.S. Cl. ............... 264/46.6; 156/315; 156/332; 260/2.5 BE; 260/18 TN; 428/425; 428/480
[51] Int. Cl.² B29D 27/00; B32B 27/40; C08G 18/14
[58] Field of Search.... 260/2.5 BE, 2.5 AB, 2.5 AC, 260/2.5 BD; 264/45, 47, 46.6

[56] References Cited
UNITED STATES PATENTS

| | | | |
|---|---|---|---|
| 2,740,743 | 4/1956 | Pace | 260/2.5 BE |
| 3,383,351 | 5/1968 | Stamberger | 260/2.5 BE |
| 3,523,093 | 8/1970 | Stamberger | 260/2.5 BE |
| 3,644,569 | 2/1972 | Pietsch et al. | 260/835 |
| 3,738,895 | 6/1973 | Paymal | 264/47 X |
| 3,823,099 | 7/1974 | Doyle | 260/2.5 BE |

FOREIGN PATENTS OR APPLICATIONS
1,137,465  12/1968  United Kingdom........... 260/2.5 BE

*Primary Examiner*—H. S. Cockeram
*Attorney, Agent, or Firm*—Lyon & Lyon

[57] ABSTRACT

A polyurethane pre-foam formulation having improved adhesion to polyester resins is disclosed. The polyurethane is of the type formed by the reaction of an isocyanate and a polyol together with a blowing agent. The improved formulation contains a polyester resin between about 1 and 10% by weight of the polyurethane together with a sufficient amount of a free radical catalyst to bring about a cure of the added polyester resin. Preferably, the improved polyurethane prefoam is foamed and cross-linked in contact with a partially uncured but gelled unsaturated polyester laminating resin which contains an unsaturated monomer such as styrene. When such a polyester and a polyurethane foam are cured together, a superior bond between them results when the polyurethane formulation is compounded in accordance with the teachings of the present invention.

5 Claims, 3 Drawing Figures

PROCESS FOR LAMINATING RIGID POLYURETHANE FOAM TO A GELLED POLYESTER RESIN

BACKGROUND OF THE INVENTION

The field of the invention relates to plastic foams, and more particularly, to relatively rigid polyurethane foams which are to be laiminated to a polyester resin formed from the reaction of an unsaturated polyester laiminating resin which contains an unsaturated monomer such as styrene. One process for forming such a lamination is disclosed in an application by Francis Gallap and the present inventor in U.S. Pat. No. 3,859,401 filed on Aug. 9, 1971 which patent is hereby incorporated by reference herein.

Many useful articles can be made from a laminate having an outer skin of a polyester resin such as fiberglass-reinforced polyester resin and an inner layer of a rigid polyurethane foam. Such laminates have been widely used in the construction of boats. While various processes have been used to form such laminates, a problem common to all prior art processes is poor adhesion at the interface between the polyester layer and the foam.

While the process disclosed in the above-described U.S. Pat. No. 3,859,401 leads to substantially improved adhesion, still further improvements would permit a further increase in load-bearing ability and thus could permit wider use of such panels as, for instance, in multi-story buildings fabricated from polyester-polyurethane laminates.

For example, a panel made according to the process disclosed in the above-identified U.S. Pat. No. 3,859,401 was tested according to ASTM E-72-68 (12) which is an impact test wherein a 60 pound bag is dropped on one face of a panel which is supported on two rollers which are separated by a 7 foot span. The initial drop is made from 6 inches and if the panel does not fail, the bag is dropped from increasing heights, which increase is at the rate of 6 inches per drop. A 2-inch thick panel having a skin thickness of 1/16th of an inch made according to the process disclosed in the above-identified application failed at 18 inches whereas a panel having the same dimensions made according to the present invention did not fail until the bag was dropped at a height of 7 feet.

Loading tests were run on 4 ft. × 8 ft. panels having a 2 inch overall thickness and two outer skins of 1/16th inch thickness. The load was applied along the 4 foot edge and the test was carried out according to ASTM E-72-68 (7). Panels made according to the process of the above-identified application withstood a load of about 600 pounds per lineal foot before laterally deflecting 1/20 of their length. Panels having the same dimensions made according to the process disclosed in the present application reached this same deflection level with a load of about 1,200 pounds per lineal foot.

Various other approaches have been tried to improve the adhesion between fiberglass-reinforced polyester and rigid polyurethane foam. These processes include the addition of a fiberglass chop which partially protrudes from one surface of a cured polyester sheet. A polyurethane pre-foam is then spread over the surface and is held to the polyester sheet by a physical entanglement and entrapment resulting from the foaming of the polyurethane in and around the extending glass fibers. While such a process provides some bonding, it does not result in a complete bond of the surface but merely relies upon an entrapment which occurs only at the points where glass fibers protrude from the surface. Another approach is to first form a cured polyurethane rigid foam followed by the planing of the surface of the foam to remove the shiny outer skin of the polyurethane. The resin and fiberglass may then be laid upon the surface of the planed foam which can result in a satisfactory bond. Such a process, however, requires several additional steps not necessary with the practice of the present invention. Still another process involves the provision of a barrier layer between the fiberglass-polyester and the polyurethane, which layer is capable of adhering both to the polyester and to the polyurethane. Such a process not only requires an additional step but also introduces a potential layer of weakness not present with the practice of the present invention.

SUMMARY OF THE INVENTION

The present invention is for an improved polyurethane formulation giving improved adhesion to polyester-fiberglass resins. The polyurethane foam utilizes conventional isocyanates, polyols and blowing agents together with between about 1 and 10% by weight of the pre-foam of an unsaturated polyester laminating resin which contains an unsaturated monomer. In addition, a free radical curing system is added which is sufficient to bring about the cross-linking or curing of the added polyester at the conditions of temperature which exists during the exothermic reaction of the polyurethane. A particularly strong bond results when the present formulation is foamed against a partially uncured but gelled polyester such as the process disclosed in U.S. Pat. No. 3,859,401 filed Aug. 9, 1971 and assigned to the assignee of the present invention. It has also been discovered that the further addition of an unadulterated polyol which contains no inhibitors, surfactants or expanders at a level of up to 40% of the added polyester results in a still further improvement in bond strength.

DESCRIPTION OF THE PREFERRED EMBODIMENTS

The polyurethane foam formulations of the present invention are advantageously used in a manner so that the foam is expanded and cured against a partially uncured but gelled unsaturated polyester laminating resin which in its uncured state, contained an unsaturated monomer such as styrene. It is believed that this gelling step causes a substantial amount of the styrene (typically a styrene level of about 30% is present with the uncured, unsaturated polyester laminating resin) to either cross-link or volatilize. In this manner, it is believed that the styrene is not present in an amount sufficient to break down or degrade the foaming polyurethane. It is further believed that the curing of the unsaturated polyester and styrene in contact with the curing polyurethane results in some chemical cross-linking which cross-linking is believed greatly enhanced by the formulations of the present invention.

Figure 1:
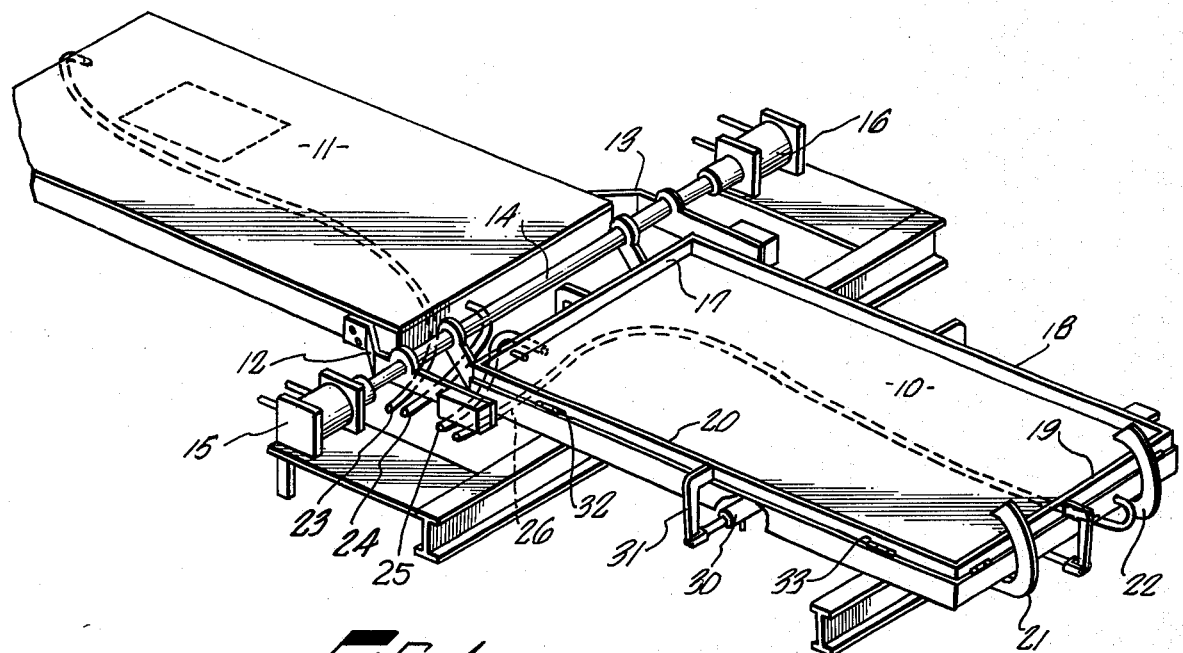
FIG. 1 is a perspective view of a mold apparatus of the type useful to produce a laminate utilizing the formulations of the present invention.

Turning now to FIG. 1, a molding apparatus is depicted which is of the type described in U.S. Pat. No. 3,809,357 filed Apr. 23, 1970 by Francis Gallap and assigned to the assignee of the present invention. That patent is incorporated by reference herein. Similar molding apparatus is also disclosed in the above-described U.S. Pat. No. 3,859,401. While the present formulation is described as useful in such a molding apparatus, the invention is not limited to use in such apparatus, as improved adhesion may be obtained by the use of any molding apparatus or forming method which permits contact between the reacting polyurethane and polyester.

The apparatus of FIG. 1 has a stationary mold surface 10 and a movable mold surface 11 which is attached by counterweighted arms 12 and 13 to shaft 14. Shaft 14 is driven by a pair of hydraulic torque motors 15 and 16. When hydraulic fluid is passed through motors 15 and 16, movable mold surface 11 rotates to a closed position where it is parallel to stationary mold surface 10. The four sides 17 through 20 of stationary mold surface 10 closed the cavity between surfaces 10 and 11 and a pair of latches 21 and 22 help to hold mold surface 11 in a closed position. Mold surfaces 10 and 11 are advantageously heated by the passage of heat transfer fluid through tubes 23 through 26. Sides 17 through 20 are advantageously hinged so that they may be moved away from mold surface 10 after the curing step is complete. This movement may be carried out hydraulically through pistons such as piston 30 which is attached to side 20 through arm 31. The sides are hinged to mold surface 10 by hinges such as those shown along side 20 and indicated by reference characters 32 and 33.

In operation, an unsaturated polyester laminating resin, which may contain an reinforcing agent such as fiberglass, is sprayed on mold surfaces 10 and 11. A catalyst system, such as a free radical system, may be mixed with the resin in the spray head in the manner known to those skilled in the art. The resin is preferably brought to a gelled condition. This may be brought about by raising its temperature slightly over normal room temperature. After the resin has substantially gelled, the novel polyurethane pre-foam is fed onto one or both of the mold surfaces, preferably only on the stationary mold surface 10. The mold is then closed and the temperature increases either by the passage of a heat transfer fluid through a hollow mold or by other heating means such as electrical heat, radiant heat, impingement by steam, hot air or the like or merely by the exothermic reaction of the polyurethane foam. If production speed is an important consideration, it is preferable that the mold surface temperatures be controlled with a heat transfer medium to permit both cooling and heating. After curing is complete, the cured laminate is cooled and removed from the mold.

Figure 3:
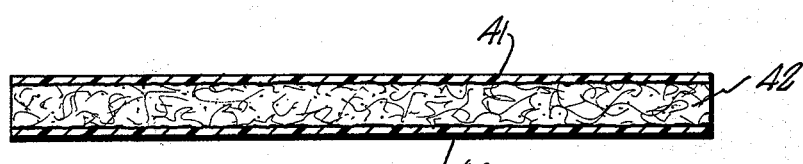
FIG. 3 is a cross-sectional side elevation of the laminate made using the formulation of the present invention.

A cross-sectional view of a typical cured laminate is shown in FIG. 3 where outer skins 40 and 41 are polyester/fiberglass resin and inner layer 42 is a polyurethane foam. The laminates need not have two outer skins, however, as a useful panel would result with only one skin layer.

As used herein, the term "unsaturated polyester laminating resin" refers to a resin such as that formed from the reaction of dibasic acids and a dihydric alcohol which contains an unsaturated monomer, such as styrene. Typically, at least a portion of the dibasic acid is unsaturated to allow cross-linking with the styrene. Although styrene levels vary depending on the amount of cross-linking desired, levels of about 33% are commonly used in such formulations. When percentages are used in this application, percent by weight rather than volume is intended.

Various means may be used to mix the various resins and catalysts. Sophisticated mixing and spraying guns have been developed which are capable of mixing a plurality of liquid materials used in the formation of polyester resins while at the same time chopping and mixing reinforcing agents such as fiberglass. Similarly, mixing and metering devices are also well-known which are capable of mixing catalysts and other ingredients with the ingredients of a polyurethane pre-foam. The various ingredients are typically maintained in drums or pots and metered at a predetermined rate into a mixing nozzle and intimately mixed just before exiting from the nozzle. By the use of such devices, it is also possible to pre-set a desired total volume of pre-foam depending upon the available free space between the mold surfaces. In addition, it is often beneficial to provide vents or sprues along the side of the mold to permit an excess of pre-foam to be added to help insure a complete filling of the mold cavity.

The polyurethane pre-foam of the present invention has as its major ingredients a conventional mixture of an isocyanate and polyol of the type useful to form a relatively rigid polyurethane foam. Such formulations are well-known and are typically compounded with additives such as surfactants, blowing agents such as trichlorofluoromethane, inhibitors and the like. When fire retardency is needed, fire retardants such as halogen containing additives and possibly antimony oxide are also added to the pre-foam. The optimum ratio of isocyanate to polyol varies with different materials from different suppliers but a typical ratio is 45% by weight isocyanate and 55% by weight polyol.

The above-mentioned urethane pre-foam ingredients are mixed with an additional mixture. The added mixture contains an unsaturated polyester laiminating resin, the catalyst for curing the polyurethane and may also contain a promoter such as cobalt octoate. Furthermore, it has been found advantageous to add a relatively small amount of a copolymer polyol which does not contain any inhibitors, expanders or fire retardants to the first added mixture. This additional polyol further increases the bond strength.

The levels of ingredients in this added mixture may be as follows: Initially, the total amount of unsaturated polyester laminating resin which we have found beneficial in improving the strength of the finished laminate is between 1 and 10% based on the total weight of the pre-foam. For ease of handling the added polyester and catalyst, we have found it desirable to add this polyester as two separate mixtures, each mixture having about equal amounts of polyester. Thus, if the total amount of polyester added was 5%, each part would contain 2½% polyester based on the weight of pre-foam. Although the total polyester may range between 1 and 10% it preferably is between 2 and 7% with about 5% being optimum for the formulations described herein. We have found it desirable to use a blend of rigid and flexible unsaturated polyester laminating resins in order to obtain the desired hardness and toughness. A blend of two-third rigid to one-third flexible has been found optimum, although other ratios can be used depending in a large part upon the individual properties of the particular rigid and flexible polyesters used.

Assuming that the resin is divided into two approximately equal parts, it is desirable to place the polyurethane catalyst in one of the parts. A satisfactory urethane catalyst is an organic liquid tertiary amine catalyst, sold under the trade name of Polycat 8 by Abbott Laboratories, Chemical Division, North Chicago, Ill. added at a level between 0.04 and 0.10% based upon the total weight of isocyanate and polyol. An optimum level for this catalyst in this system has been found to be about 0.08%.

A promoter such as cobalt octoate is not essential but does help improve the strength of the resulting cured foam and levels of up to about 1% are beneficial with an optimum amount being about 0.75% based upon the total weight of unsaturated polyester laminating resin which is added to the pre-foam.

The addition of an unadulterated copolymer polyol has been found beneficial at levels between 3 and 40% based upon the total weight of added unsaturated polyester laminating resin with levels between 2.5 and 10 being preferred and about 5% being optimum.

The remaining part of added unsaturated polyester laminating resin contains the free radical catalyst system in an amount sufficient to cure or cross-link the added polyester under the temperature conditions occurring during the foaming reaction. Benzoyl peroxide is a commonly used free radical catalyst and levels between 1 ½ to 3% based upon the total added polyester resin is recommended with a level of about 2% being optimum. In addition, a promoter such as dimethyl aniline is preferably combined with the second portion of polyester resin and levels between 0.15 and 0.75% can be used with a preferred range being between 0.2 and 0.5 and preferably about 0.2% by weight based upon the total weight of added polyester resin.

Skins of the laminate are also formed from an unsaturated polyester laminating resin of a type similar to that added to the urethane pre-foam described above. The resins catalysts and promoters are mixed together and combined with a reinforcing material such as fiberglass and applied to the mold surfaces. For large volume operations, this step is most readily carried out by the use of a spray gun capable of mixing two liquid streams, one of which contains the catalyst and the other which contains the promoter. Such guns also can add chopped fiberglass or other reinforcing materials. It is not necessary for the practice of the present invention, however, that chopped fiberglass be the reinforcing material and fiberglass cloth or other reinforcing materials may also be used. One important advantage in the practice of the present invention results from the pressure generated by the expanding polyurethane foam against the partially cured and yet still flowable polyester resin. This pressure makes it possible to eliminate any rolling step, and thus where low-cost, high-volume operations are desired, the use of automatically chopped fiberglass is advantageous. That is, the additional labor required to "lay up" woven fiberglass and the steps necessary to remove air pockets would tent to make the process less efficient.

Assuming the outer skin resin is mixed from two separate but equal streams, the first stream should contain, in addition to the resin, a free radical catalyst such as benzoyl peroxide. Levels of between 1½ to 3% based upon the total amount of resin used in the outer skin may be used with about 2% being optimum. As above, it has been found that a blend of rigid and flexible unsaturated polyester laminating resins produce a panel having maximum toughness. The second stream may contain the same blend of polyester resins as the first stream together with the promoter or promoters. It has been found that a mixture of dimethyl aniline and cobalt octoate is an effective promoter system although other promoter systems may be used. The level of dimethyl aniline should be between 0.15 and 0.75% with a preferred range being between 0.2 and 0.5% and a optimum level of 0.2% based upon the total amount of resin in a outer skin or skins. The level of cobalt octoate is not critical and levels between 0.6 and 1.4% based upon total amount of resin in the outer skin or skins have proved satisfactory. An optimum amount is about 1.1%.

Figure 2:
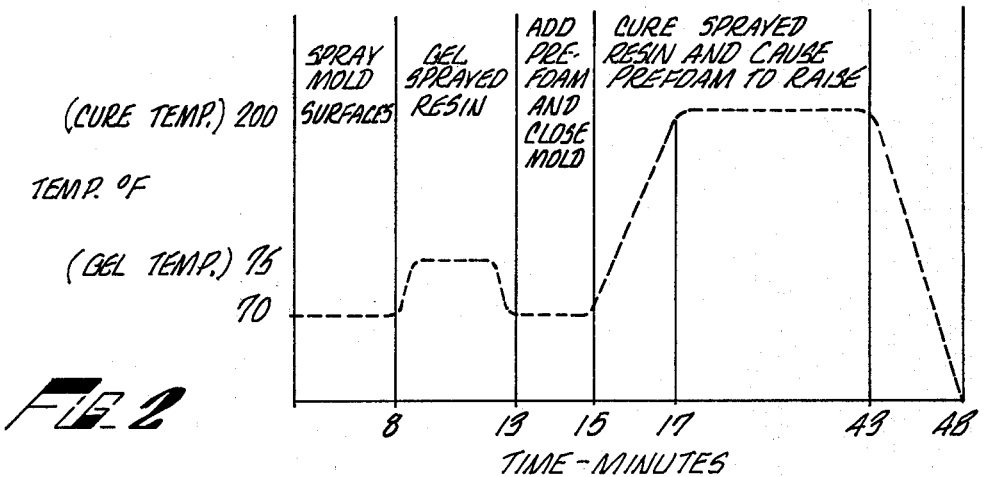
FIG. 2 is a graph showing a time-temperature profile for a typical curing cycle for a laminate utilizing a formulation of the present invention.

Turning now to FIG. 2, a time-temperature profile for a typical laminate made with the ingredients described above is shown. An illustrative example is given below utilizing the profile of FIG. 2. The two parts of the unsaturated polyester laminating resin used for the outer skin are mixed in a spray gun together with chopped fiberglass and sprayed upon the mold surfaces such as mold surfaces 10 and 11 of FIG. 1. The mold surfaces are preferably coated with a mold release agent such as a carnauba paste wax. The mold surfaces are maintained at about 70°F in order to prevent premature gelling or curing and to enable an even coat of resin to be applied before any curing takes place. If a less active catalyst system is used, of course, the temperature may be higher and conversely, if a more active catalyst system is used, it may be lower. For the preferred system described herein, a temperature of about 70°F has been found satisfactory. An even coat of about 1/16th inch thickness was applied to both the mold surfaces which took about 8 minutes. After the spraying step was complete, the mold surface temperature was raised to 75°F by passing 75°F warm water through heat transfer tubes located on the backside of the mold surface. The resin gelled after about 4 minutes time at 75°F. The gelling could readily be detected by a noticeable color change in the resin which is also accompanied by a large increase in viscosity. The mold temperature is again decreased to 70°F by passing 70°F water through heat transfer tubes in order to prevent a more complete curing of the skins. The pre-foam used contained 45% isocyanate and 55% polyol which was mixed with two streams, each stream containing 2½% by weight (based on the polyurethane resin) of the same polyester resin used for the outer skin. The first stream contained, in addition to the 2½% polyester, 1.5% (based upon the total amount added polyester in the polyurethane foam) of an organic liquid tertiary amine catalyst sold under the trade name of Polycat 8 by Abbott Laboratories, Chemical Division, North Chicago, Ill. In addition, cobalt octoate at a level of 0.75% by weight (based upon the total added polyester resin) was added. The other ingredient in the first polyester added stream was a copolymer polyol at a level of 5% of the total added polyester. The second stream which was added to the polyurethane pre-foam contained, in addition to the 2½% unsaturated polyester laminating resin, 2% of benzoyl peroxide (based upon the total weight of added polyester) and 0.2% dimethyl aniline promoter (again based on added polyester). The pre-foam ingredients were mixed and deposited on one of the gelled polyester resin surfaces, the total time of foam addition being about 2 minutes.

After the foam had been deposited, the mold was closed and the mold temperature raised to 200°F by the passage of hot water through the heat transfer tubes of the mold. The mold temperature reached 200°F after a total time of 17 minutes which was 2 minutes after the mold was closed. The heat transfer fluid was maintained at 200°F for 26 minutes at which time cold water was introduced into the transfer tubes and the laminate was cooled for 5 minutes. The cured laminate was then removed from the mold.

It is not essential that the mold surfaces be heated since the polyurethane reaction is an exothermic one and is capable of providing sufficient heat to cure both the foam and the outer skins. If the mold is not heated, however, substantially longer curing times are recommended and, of course, if the mold cannot be cooled, a substantially longer cooling period is necessary. Furthermore, a more rapidly curing resin-catalyst system could be used.

The laminate described in the example above had two outer skins, each having a thickness of about 1/16th inch and the total thickness of the laminate was 1½ inches. The panel was 4 feet wide by 8 feet long and weighed 40 pounds. The lamination strength between the foam and the outer skin was excellent and when a sample of the laminate was cut apart it could be seen by inspection that there were no substantial amounts of shiny or unbonded polyester resin at the interface between the polyester resin and the polyurethane foam. The panel had exceptional strength and could readily withstand a 200 pound load placed on the upper surface of the panel midway between supports below the panel which were separated a distance of 3 feet. A similar laminate made with the same ingredients with the exception of the additional unsaturated polyester laiminating resin in the polyurethane foam delaminated and fractured when a 200 pound weight was placed midway between supports separated by 3 feet. Also, when this laminate was cut apart, shiny pockets of unlaminated areas could be observed at the interface between the polyester resin and polyurethane foam. ASTM test results are discussed in the background of the invention above and the improved results were obtained in tests run on panels using the formulations and technique described in the above example. These results dramatically demonstrate the improved strength observed by the use of formulations of the present invention.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A process for laminating a rigid polyurethane foam to a gelled polyester resin comprising adding two mixtures to a pre-foam mixture of a polyisocyanate and polyol with sufficiently high functionality to form a rigid foam; said first mixture comprising:

about 2½% by weight of said polyisocyanate and polyol of an unsaturated polyester laminating resin, between 1 and 2% by weight based upon the total weight of added polyester resin of an organic amine catalyst, about 0.75% by weight based upon the total weight of added polyester of cobalt octoate, and said second mixture comprising:

about 2½% by weight based upon the total weight of said polyisocyanate and polyol of a polyester resin, between about 1.5 and 3% by weight based upon the total weight of added polyester resin of benzoyl peroxide and between about 0.15 and 0.75% by weight based upon the total weight of added polyester of dimethyl aniline; contacting the pre-foam mixture to a gelled polyester resin; curing the gelled polyester and pre-foam at elevated temperatures to produce a polyester-polyurethane foam laminate of improved adhesion.

2. The process of claim 1 wherein said organic amine catalyst is added at a level of about 1.5%.

3. The process of claim 1 wherein said cobalt octoate is added at a level of about 0.75%.

4. The process of claim 1 wherein said benzoyl peroxide is added at a level of about 2%.

5. The process of claim 1 wherein said dimethyl aniline is added at a level of about 0.2%.

* * * * *